(No Model.)
W. WICKLIFFE & W. P. McCARTER.
Cotton Planter and Fertilizer Distributer.

No. 238,738. Patented March 8, 1881.

Witnesses:
J. M. Dunham
J. McNamee

Inventor:
Wm. Wickliffe,
W. P. McCarter.
By H. J. Ennis
Atty.

United States Patent Office.

WILLIAM WICKLIFFE AND WILLIAM P. McCARTER, OF ANTREVILLE, S. C.

COTTON-PLANTER AND FERTILIZER-DISTRIBUTER.

SPECIFICATION forming part of Letters Patent No. 238,738, dated March 8, 1881.

Application filed October 23, 1880. (No model.)

*To all whom it may concern:*

Be it known that we, W. WICKLIFFE and W. P. McCARTER, citizens of the United States, residing at Antreville, in the county of Abbeville and State of South Carolina, have invented certain new and useful Improvements in Cotton-Planters and Fertilizer-Distributers; and we do hereby declare the following to be a full, clear, and exact description of the invention, such as will enable others skilled in the art to which it appertains to make and use the same, reference being had to the accompanying drawings, and to the letters or figures of reference marked thereon, which form a part of this specification.

Figure 1:
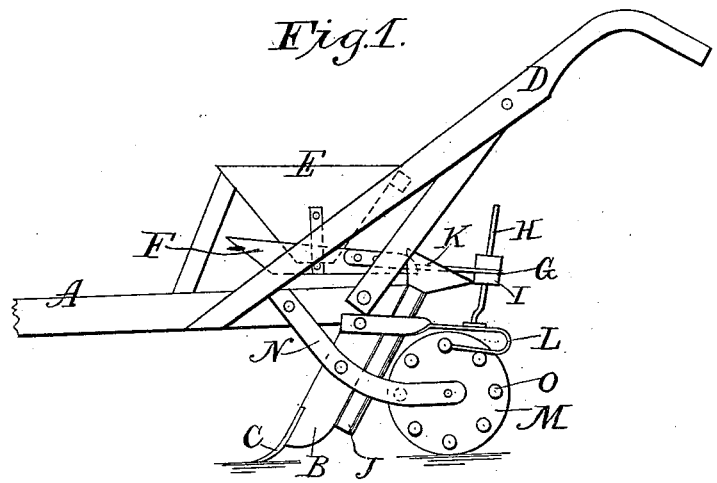
Figure 2:
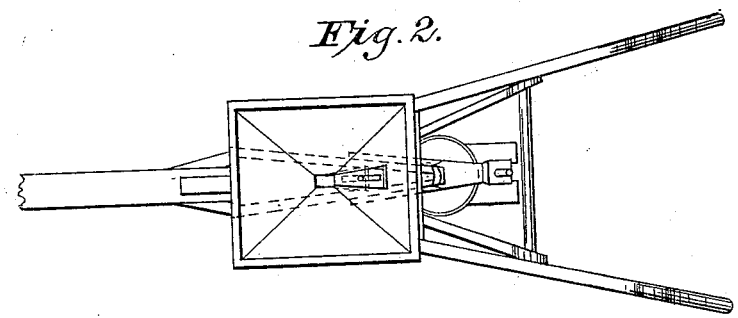
Figure 3:
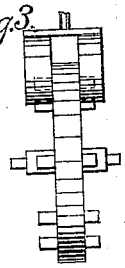

Figure 1 is a side elevation of an interchangeable fertilizer-distributer and cotton-seed planter embodying our improvements. Fig. 2 is a plan view, and Fig. 3 is a partial rear elevation, of the implement.

This invention has relation to an interchangeable fertilizer-distributer and cotton-seed planter; and it consists in the improved features of construction and combination hereinafter fully described, and particularly pointed out in the claim.

Referring by letter to the accompanying drawings, A designates the plow-beam, B the standard, and C the plow, of any ordinary construction.

D designates the plow-handles, between which the hopper is secured.

Below the hopper E is hung a shoe, F, provided with a rearwardly-projecting arm, G, through which a screw-threaded rod, H, passes, and an adjusting-nut, I, is employed to move the arm G up or down upon the rod H, to regulate the vertical sweep of the shoe F when in operation.

A conducting-spout, J, with a funnel-shaped top, K, is secured to the rear face of the plow-standard B, and receives and conducts the fertilizer or the cotton-seed, as the case may be, as it is shaken from the shoe, to the bottom of the furrow opened by the plow.

The screw-threaded rod H rises from a hook-shaped spring-arm, L, pivoted to the plow-standard B; and a wheel, M, supported in arms N, projecting from the standard B and beam A toward the rear of the plow, is provided with lateral pins O, upon which the pivoted spring-arm L strikes when the implement is drawn forward, thereby imparting motion to the shoe F, and causing the fertilizer or cotton, as the case may be, to be shaken into the spout and conducted to the bottom of the furrow. In the case of cotton-seed it should be first rubbed or rolled in ashes or guano and partially dried before being sown. The plow opens the furrow and removes stones, sticks, and the like from the bottom of the furrow, leaving an unobstructed track for the wheel, so that its action is uniform. The spout conveys the fertilizer to the bottom of the furrow, and a sufficient amount of dirt falls in after the plow to cover the fertilizer and protect it from the sun and air, and thus retain the ammonia longer than it would be retained were the fertilizer wholly exposed, thereby furnishing better results.

This construction affords a saving of one man, in this, that no one is required to follow and cover the fertilizer or cotton-seed.

The device is simple and cheap, and may be used interchangeably for fertilizer or for cotton-seed.

We do not wish to be understood as claiming, broadly, the features shown in the several references cited separately or independent; but What we do claim as new and useful, and desire to secure by Letters Patent, is—

The combination, in an interchangeable fertilizer-distributer and cotton-planter, of the plow-beam A, the hopper E, the shoe F, provided with the arm G, the screw-threaded rod H, projecting from the pivoted hook-shaped arm L, the nut I, spout J K, and the wheel M, provided with the lateral pins O, constructed substantially as and for the purpose set forth.

In testimony whereof we affix our signatures in presence of two witnesses.

WILLIAM WICKLIFFE.
WILLIAM P. McCARTER.

Witnesses:
WM. T. MILFORD,
R. T. GORDON.